United States Patent [19]

Albrecht et al.

[11] Patent Number: 5,411,391
[45] Date of Patent: May 2, 1995

[54] PRESTRESS DEVICE

[75] Inventors: Peter Albrecht, Hamburg; Michael Linke, Ahrensburg; Marek Peterko, Tornesch, all of Germany

[73] Assignee: Krupp Corpoplast Maschinenbau GmbH, Germany

[21] Appl. No.: 44,305

[22] Filed: Apr. 7, 1993

[30] Foreign Application Priority Data

Apr. 15, 1992 [DE] Germany .......... 42 12 584.7

[51] Int. Cl.6 .................................... B29C 49/56
[52] U.S. Cl. .................. 425/451.9; 425/522; 425/541
[58] Field of Search .......... 425/541, 522, 451.2, 425/450.1, 451.9

[56] References Cited

U.S. PATENT DOCUMENTS

| | | | |
|---|---|---|---|
| 3,782,879 | 1/1974 | Mnilk et al. | 425/541 X |
| 3,829,264 | 8/1974 | Mnilk et al. | 425/541 X |
| 4,025,266 | 5/1977 | Linde et al. | 425/451.2 X |
| 4,032,277 | 6/1977 | Linde et al. | 425/451.2 X |
| 4,392,802 | 7/1983 | Bortolotti et al. | 425/541 X |
| 4,650,412 | 3/1987 | Windstrup et al. | 425/541 X |
| 4,762,486 | 8/1988 | Windstrup et al. | 425/451.9 X |

Primary Examiner—Richard L. Chiesa
Attorney, Agent, or Firm—Harness, Dickey & Pierce

[57] ABSTRACT

The device serves to apply a prestress to blow moulding elements mounted in the region of mould carriers. The blow moulding elements am adjacent to each other in the area of a mould seam and in each case regionally enclose an internal space, which is intended for shaping a container manufactured with a blow process. In an elastomer a positioning element is embedded at least regionally and is enclosed at a distance by a peripheral element. At least part of the elastomer is arranged between the peripheral element and the positioning element in order to form an elastic connection.

17 Claims, 5 Drawing Sheets

PRESTRESS DEVICE

BACKGROUND AND SUMMARY OF THE INVENTION

The invention relates to a device for applying a prestress to structural elements, in particular for the prestressing of blow moulding elements mounted in the area of mould carriers, with these elements being adjacent to each other in the area of a mould seam and each enclosing an internal space, which is designed for shaping a container manufactured by a blow process.

A typical operating cycle in connection with the production of containers made of thermoplastic material, in particular in connection with the production of containers made of a biaxially oriented polyethylene terephthalate, consists of using air forced into the containers to shape such containers, which are made, for example, out of an injection molded preform that has been suitably thermally conditioned. This creates pressures in the range of approximately 40 bars, which cause the blow mould elements surrounding the interior space to no longer be firmly attached to each other but to be slightly pushed apart despite the locking of the mould carriers. This causes the manufactured container to deviate from the intended shape. Specifically the volume of the container increases and the gap arising between the blow moulding elements appears as an elevation on the container.

The devices presently known for applying prestress are not sufficiently suitable to permit not only a cost-effective realization, but also a simple assembly and a long service life.

Therefore the purpose of this invention is to create a device of the above mentioned kind that through a simple mechanical design achieves high reliability and a long service life.

The invention solves the task by embedding in an elastomer at least locally a positioning element, which is encircled at a distance by a peripheral element, and by arranging between the peripheral element and the positioning element at least a portion of the elastomer, so as to form an elastic connection.

Through the connection of the positioning element with the peripheral element by an elastomer a restoring force is exerted due to the elastically deformed elastomer, following a deflection of the positioning element relative to the peripheral element, with this force leading to a return of the positioning element back into its original position. Additionally, the elastomer causes a seal, which makes it possible, for instance, to use a gaseous or liquid pressure medium to move the positioning element without additional substantial sealing measures. The distance between the positioning element and the peripheral element is arranged so as to ensure that a sufficient volume of elastomer is present, which may be sufficiently deformed elastically to effect a multiplicity of deflection movements.

According to one preferred embodiment of the invention the front and back sides of the positioning element and the peripheral element, which are connected by an intermediate space located between the peripheral and positioning element, are each provided with an elastomer layer, which enter into the elastic connection arranged between the peripheral and positioning element. This layer increases the sealing qualities and provides an additional supply of elastomer, which is available for elastic deformation. Additionally, the contact between the elastomer and the position and peripheral elements is improved thereby, decreasing the danger of detachment.

According to another preferred embodiment of the invention vulcanized rubber is used as an elastomer. Vulcanized rubber has a high degree of permanent elasticity and attaches very well to surfaces covered by it, if it is vulcanized directly to the surfaces of the peripheral element and the positioning element.

According to another preferred embodiment the peripheral element is stretched around the positioning element in an enclosing fashion and the positioning element essentially is in the form of plates. The closed version of the peripheral element maintains its shape during the application of pressure to change the location of the positioning element. Furthermore, a reliable guide is created for the positioning element and a mechanically stable mounting is created, for instance in the area of a mould carrier. The platelike design of the positioning element provides a large adhesion area. This makes it possible to impose pressure over a large area to the blow moulding elements as well as provide a large working surface for the pressures effecting a change in location. In particular, it is intended to make available a small filling volume in order to allow a fast pressure build-up. The pressure build-up in the filling volume takes place more rapidly than the pressure build-up in the container.

Further details of the present invention follow from the detailed description below and the attached drawings, which graphically show the preferred embodiments of the invention.

DESCRIPTION OF THE PREFERRED EMBODIMENTS

Figure 1:
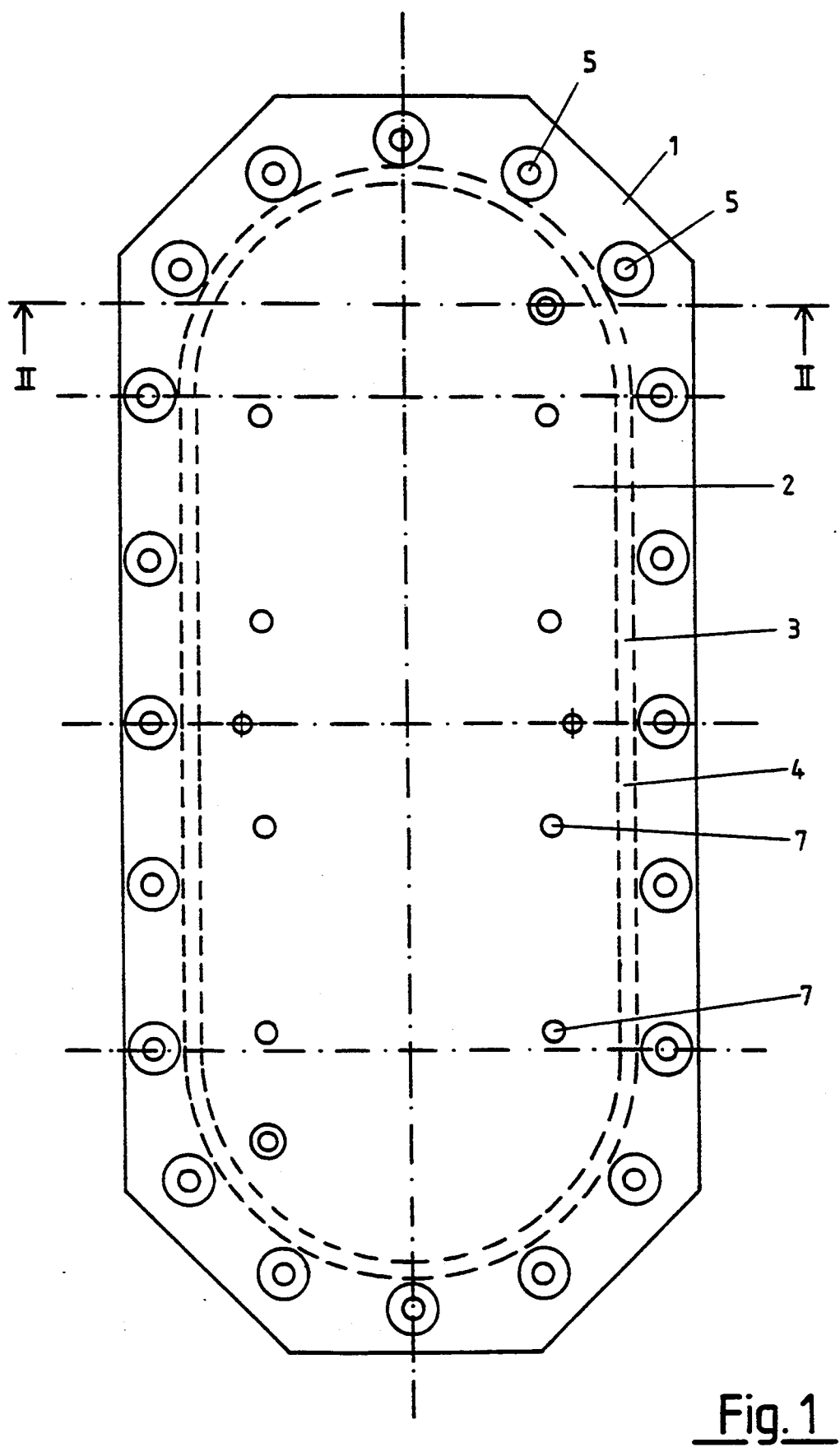
FIG. 1 a top view of a device consisting of a peripheral element and a positioning element, which are connected by an elastomer, FIG. 2 an enlarged cross section according to intersection line II—II in FIG. 1, FIG. 3 a cross section of the device in FIG. 1 shown in perspective, FIG. 4 a cross section of the positioning element in a displaced condition, FIG. 5 a partial representation of the cross section of a device in which the positioning element and the peripheral element are supplied with profile sections facing each other and FIG. 6 a simplified cut through a blow station, which provides for blow moulding elements mounted in mould carriers and held by adapter shells, and in which a prestress device that can be impacted on by a pressure medium is positioned between one of the adapter shells and one of the mould carriers.

According to the embodiment in FIG. 1, a device for the production of prestress forces consists essentially of a peripheral element (1) and a positioning element (2), which are separated by an intermediate space (3). The space (3) is filled with an elastomer (4), which is connected to the surfaces of the peripheral element (1) and the positioning element (2) in the area of the intermediate space (3).

Figure 6:
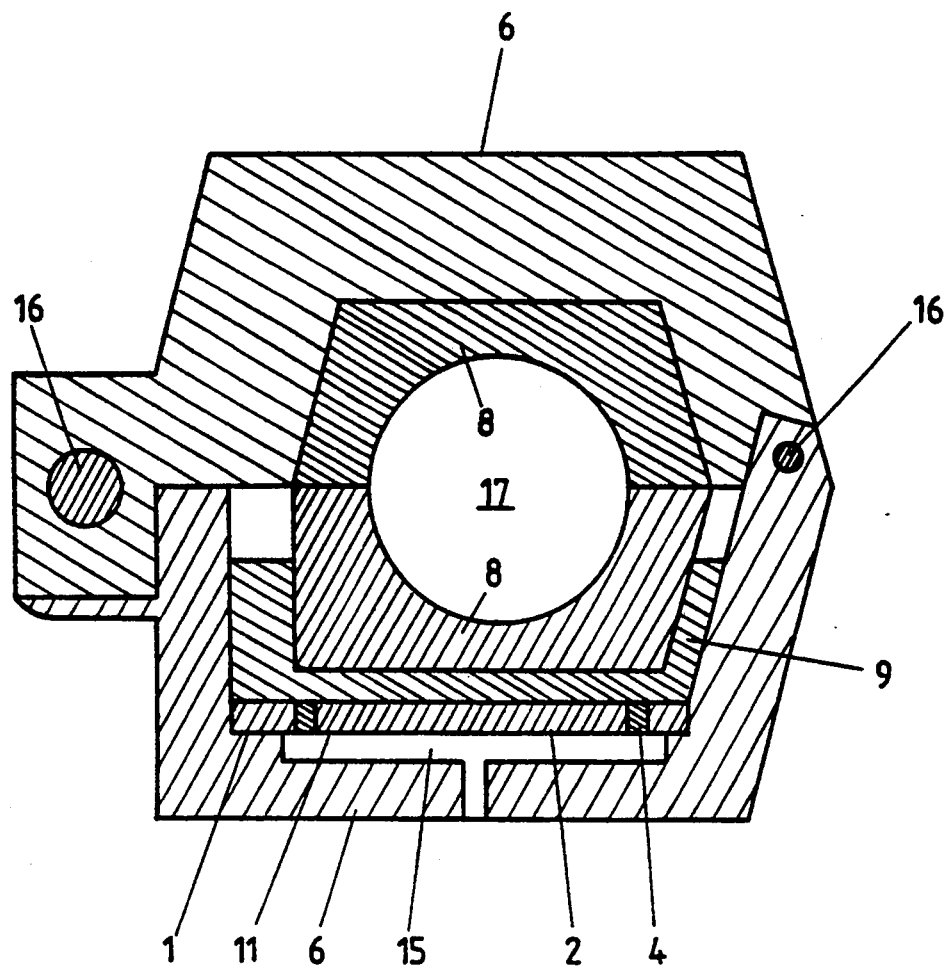

The peripheral element (1) extends around as an enclosed ring and has bored holes (5), which permit it to be screwed together with the mould carriers (6) shown in FIG. 6. There are holes (7)in the region of the positioning element (2) which are intended to connect with a blow moulding element (8) or with an adapter shell (9) arranged between a blow moulding element (8) and the mould carrier (6). The holes (5,7) may pass clear through or may designed as blind holes to help provide sealing qualities.

Figure 2:
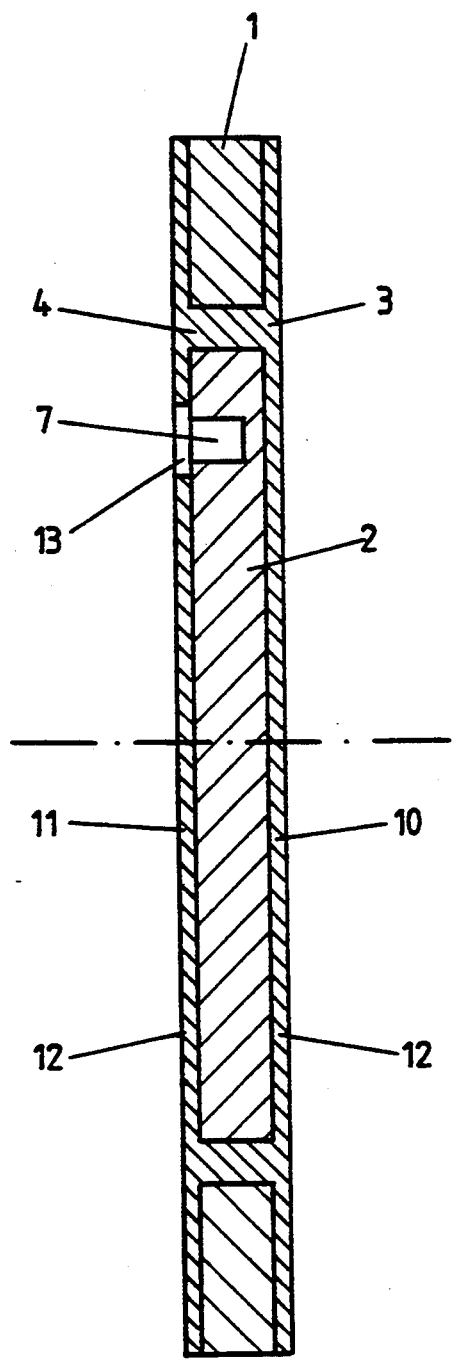
Figure 3:
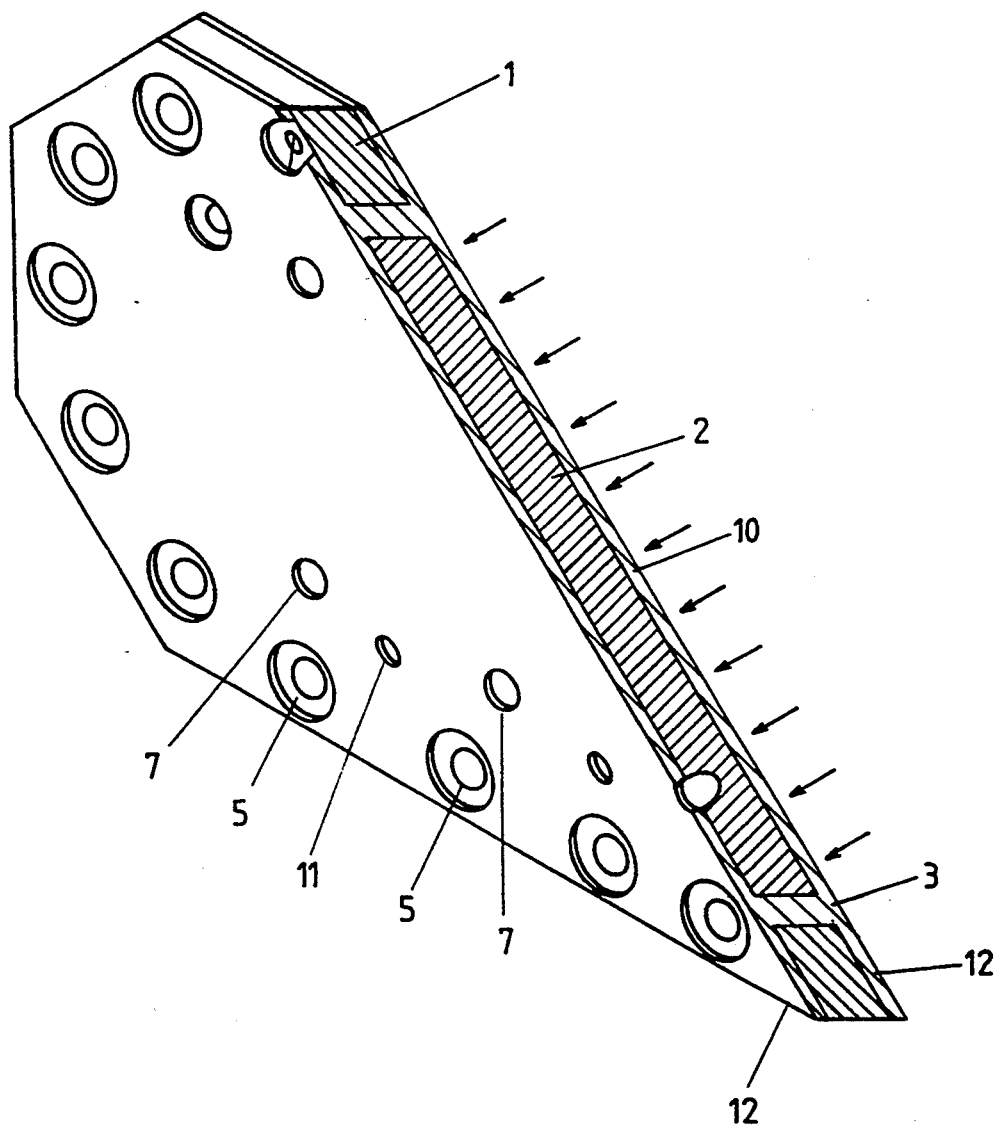
Figure 4:
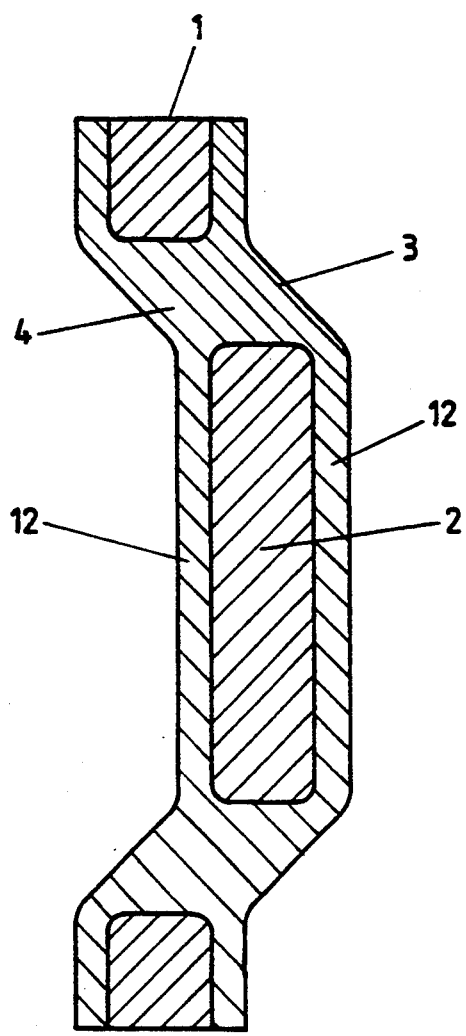
Figure 5:
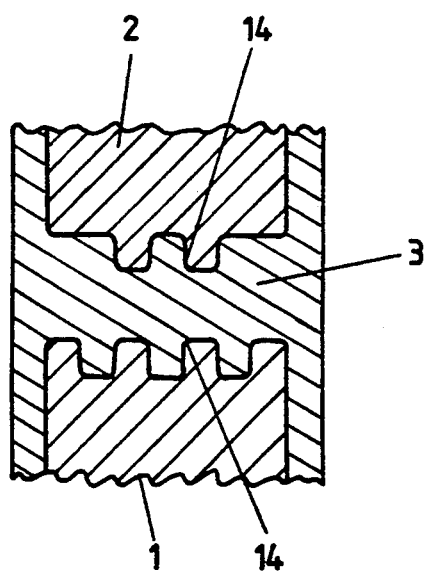

The drawing in FIG. 2 shows that the platelike positioning element (2) and the peripheral element (1)in the area of the front sides (10) and back sides (11) are covered by elastomer layers (12) which are connected with each other by the elastomer (4) arranged in the intermediate space (3). The holes (5,7) may be equipped with annular receiving slots (13) in order to allow the screw heads to be recessed.

To improve the connection of the elastomer (4) with the peripheral element (1) or the positioning element (2), profile sections (14) may be located in the area of the boundaries of the peripheral element (1) or the positioning element (2) that face each other. These profile sections (14) create a mould closure between the elastomer and the elements (1,2) which decreases the effect of shear forces.

In connection with the arrangement of the prestress device in the area of the mould carriers (6) according to FIG. 6 a hollow space (15) is provided for in the area of the back side (11) away from the adapter shell (9), which is intended to accommodate a pressure medium that effects the adjustment of the positioning element (2). Essentially also one or more pressure-medium supply lines without a separate hollow space (15) are sufficient, since after a lifting off of the positioning element an interior space is created automatically. Instead of using a gaseous or liquid pressure medium, a mechanical adjustment of the positioning element is also possible.

The mould carriers (6) are mechanically locked relative to each other by the locking elements (16). One of the locking elements (16) can simultaneously be designed as a shaft to swing the mould carriers (6) relative to each other. The interlocking of the blow moulding elements (8) relative to each other creates an interior space that is precisely defined (17), which does not change its volume even in case of exertion of internal pressure during expansion of a preform to a container.

To support the return movement of the positioning element (2) to a beginning position a readjusting spring element may be installed in addition to the restoring force of the elastomer. The readjusting element may be positioned either inside the mould carriers (6) or, if suitable fasteners are used, outside the mould carriers (6).

To reduce the effect of shear forces the edges of the peripheral element (1) as well as those of the positioning element (2) have been rounded. However, in order to have adequate guidance of the positioning element (2) through the peripheral element (1), linear areas am provided for joining the rounded areas. The linear areas of the peripheral element (1) as well as the positioning element (2) essentially run parallel to each other.

As an alternative to the positioning element (2) being formed out of one uniform plate, it is also possible to combine several segments with each other, which am separated from one another by spaces filled by the elastomer (4). The elastomer (4) may be either a uniform material, or it may be composed of several components or may consist of several layers of combined material. The blow moulding element (8) or the adapter shell (9) assigned to the positioning element (2) is suspended in gimbal fashion relative to the mould carrier (6) due to the combined effect of the positioning element (2), the peripheral element (1) and the elastomer (4). This allows an automatic centering relative to the other blow moulding element (8) that is firmly connected to the other mould carrier (6).

To effect the blow moulding of a container, first the blow mould is opened by unlocking and spreading of the mould carrier (6). Subsequently the preform is moved into the area of the interior space (17) and then the mould carrier (6) is swung into the closed position. After closing, the mould carriers are mechanically connected to one another with the aid of the locking elements (16). After executing this mechanical connection a pressure medium is applied to the space (15) which causes a displacing of the positioning element (2). By this displacement the blow moulding element (8) facing the positioning element (2) is pushed against the other blow moulding element (8). The provided contact-pressure force exceeds the maximum forces arising during the blow forming of the preform, which result from the internal pressure in the interior space (17). After the finished blown container is placed on the blow moulding elements (8) the interior pressure decreases and subsequently there is a pressure release in the area of the hollow space (15). After unlocking the form carrier (6) and opening the blow station, the finished container can be removed.

We claim:

1. A device for applying a prestress to structural elements, said structural elements being positioned adjacent to each other in the area of a mould seam and in each case regionally enclosing an internal space which is intended for shaping a container manufactured by a blow process, said device comprising:

a positioning element having a front surface and a back surface;

a peripheral element surrounding said positioning element in spaced relationship thereto, said peripheral element having a front surface and a back surface; and elastomeric means provided between and interconnecting said peripheral element and said positioning element, said elastomeric means overlying said front and back surfaces of said positioning element and said peripheral element to form an elastic connection therebetween.

2. A device according to claim 1, wherein the elastomeric means (4) at least regionally is formed as a vulcanized rubber.

3. A device according to claim 2, wherein the peripheral element (1) is formed as a closed ring.

4. A device according to claim 3, wherein the positioning element (2) is substantially in the form of a plate.

5. A device according to claim 4, wherein the positioning element (2) is positioned between a mould carrier (6) and a blow moulding element (8).

6. A device according to claim 5, wherein the positioning element (2) is positioned between the mould carrier (6) and an adaptor shell (9) supporting the blow moulding element (8).

7. A device according to claim 6, wherein a plurality of the mould carriers (6) are positioned so that they can be locked mechanically with respect to each other by means of locking elements (16).

8. A device according to claim 1, wherein the peripheral element (1) is formed as a closed ring.

9. A device according to claim 1, wherein the positioning element (2) is substantially in the form of a plate.

10. A device according to claim 1, wherein the positioning element (2) is positioned between a mould carrier (6) and a blow moulding element (8).

11. A device according to claim 1, wherein the positioning element (2) is positioned between a mould carrier (6) and an adaptor shell (9) supporting a blow moulding element (8).

12. A device according to claim 1, wherein a plurality of the mould carriers (6) are positioned so that they can be locked mechanically with respect to each other by means of locking elements (16).

13. A device according to claim 1, wherein the elastomeric means (4) at least regionally is formed as a vulcanized rubber.

14. A device for applying a prestress to structural elements which are positioned adjacent to each other in the area of a mould seam, said structural elements together defining an internal space for forming an article, said device comprising:
a positioning element with means for applying a prestressing force to said structural element, said positioning element having a front surface and a back surface;
a peripheral element surrounding said positioning element and positioned in spaced relationship to said positioning element, said peripheral element having a front surface and a back surface; and
an elastomeric member positioned in said space between said positioning element and said peripheral element, said elastomeric member forming an elastic interconnection between said peripheral element and said positioning element, said elastomeric member overlying said front and back surfaces of said positioning element and said peripheral element.

15. A device according to claim 14 wherein said peripheral element is formed as a closed ring.

16. A device according to claim 14 wherein said positioning element comprises a plate movable relative to said peripheral element to exert said prestress on said structural elements.

17. A device according to claim 14 wherein said elastomeric member also overlies at least one surface of said peripheral element and one surface of said positioning element.

* * * * *

UNITED STATES PATENT AND TRADEMARK OFFICE
CERTIFICATE OF CORRECTION

PATENT NO. : 5,411,391
DATED : May 2, 1995
INVENTOR(S) : Peter Albrecht et al

It is certified that error appears in the above-indentified patent and that said Letters Patent is hereby corrected as shown below:

ON THE TITLE PAGE, under "Attorney, Agent or Firm", "Harness, Dickey & Pierce" should be --Harness, Dickey & Pierce, P.L.C.--.

Abstract, line 3, "am" should be --are--.

Column 3, line 2, "(7)in" should be --(7) in--.

Column 3, line 10, "(1)in" should be --(1) in--.

Column 3, line 57, "am" should be --are--.

Column 3, line 64, "am" should be --are--.

Signed and Sealed this

Eighteenth Day of July, 1995

Attest:

BRUCE LEHMAN

Attesting Officer    Commissioner of Patents and Trademarks